United States Patent
Sullivan

[15] 3,679,092
[45] July 25, 1972

[54] FUEL TANK FOR USE IN MODEL AIRPLANES

[72] Inventor: Matthew A. Sullivan, Elkins Park, Pa.
[73] Assignee: Sullivan Products, Inc., Willow Grove, Pa.
[22] Filed: Sept. 15, 1969
[21] Appl. No.: 857,869

[52] U.S. Cl. ..........................220/85 R, 123/136, 244/135
[51] Int. Cl. ........................................................B65d 25/00
[58] Field of Search..............244/135, 135 B; 220/85 R, 86, 220/85 S, 85 SP, 97, 23.83, 18; 215/11; 280/5; 46/76, 78; 222/393, 481.5, 478; 128/214; 123/136; 261/121, 119

[56] References Cited

UNITED STATES PATENTS

| | | | |
|---|---|---|---|
| 2,446,612 | 8/1948 | Sauser et al. | 244/135 |
| 3,233,652 | 2/1966 | Phillips | 261/35 |
| 3,330,439 | 7/1967 | Moorman | 220/86 |
| 3,517,654 | 6/1970 | Sarto et al. | 123/136 |
| 3,285,478 | 11/1966 | Gordon | 222/478 |

FOREIGN PATENTS OR APPLICATIONS

| | | | |
|---|---|---|---|
| 1,420,533 | 11/1965 | France | 280/5 A |
| 1,483,961 | 5/1967 | France | 220/97 |

*Primary Examiner*—Raphael H. Schwartz
*Attorney*—Seidel, Gonda & Goldhammer

[57] ABSTRACT

A fuel tank for use in model airplanes is disclosed, the fuel tank including an angled surface through which the fuel feed line and vent line pass to permit mounting of the fuel tank at the centerline position in "profile" fuselages, and between closely spaced or behind partly obstructed bulkheads in built-up fuselages.

6 Claims, 7 Drawing Figures

PATENTED JUL 25 1972

INVENTOR.
MATTHEW A. SULLIVAN
BY
Seidel, Gonda & Goldhammer
ATTORNEYS.

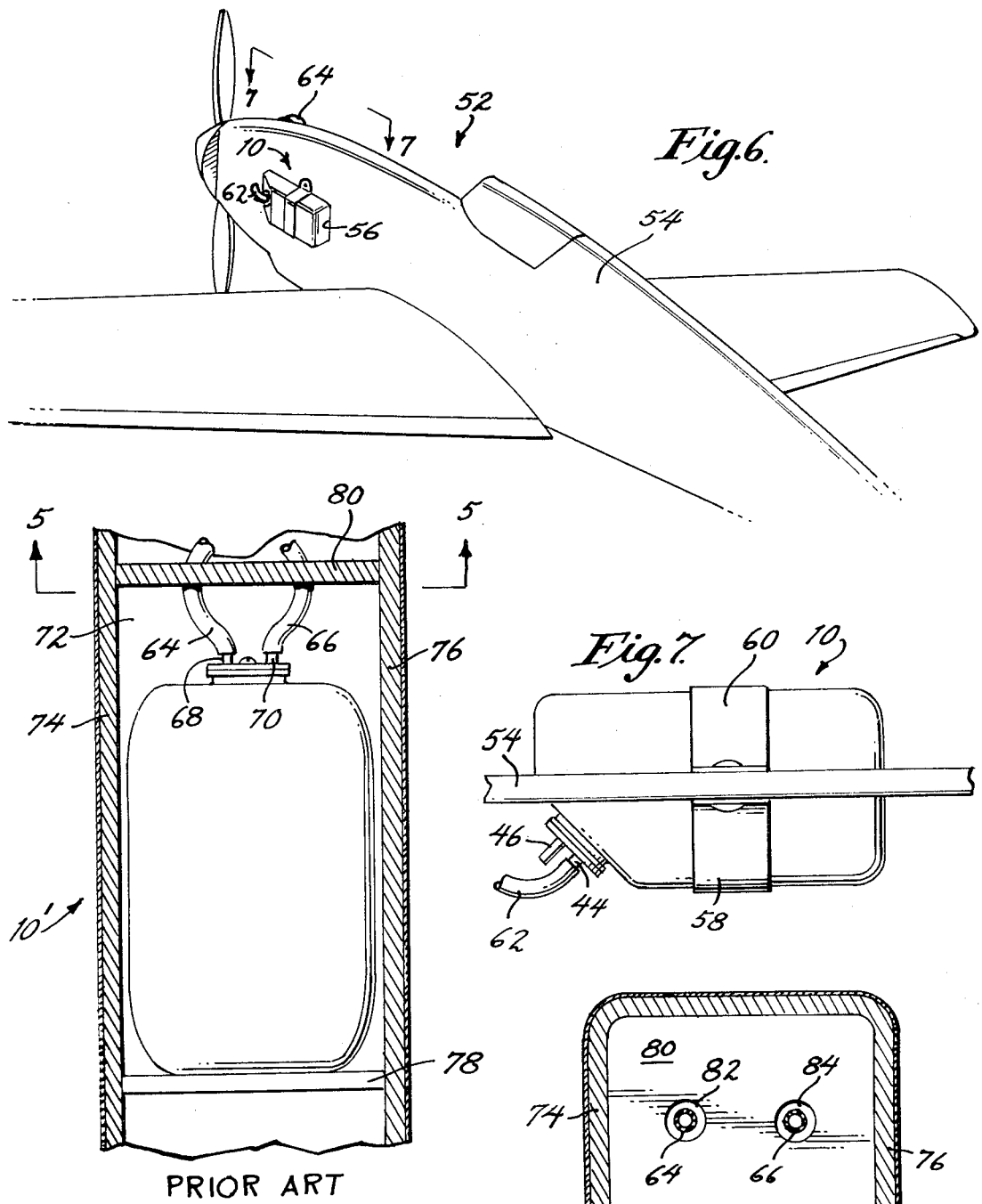

FUEL TANK FOR USE IN MODEL AIRPLANES

This invention relates to a fuel tank for use in model airplanes, and more particularly, to a fuel tank especially suited for mounting in "profile" fuselages in a centerline position, and closely spaced bulkheads in built-up fuselages.

One widely used and well-known type fuel tank used in model aircraft is known as a "clunk" tank. Such a tank includes a fuel-containing body, usually molded of plastic, and into which a fuel feed line and vent line pass. The fuel feed line, in the usual tank of this sort, includes a short length of rigid tubing, usually brass, retained in a central axially directed opening of the body. The remainder of the fuel feed line comprises a length of flexible tubing within the body of the tank, and a weighted intake end secured to the remote end of the flexible tubing. When the model assumes various flight altitudes, the weighted end of the tubing causes the tubing to shift under the influence of gravity and acceleration forces just as the fuel supply does. Hence, an uninterrupted fuel flow is obtained.

The nozzle end of the fuel line strikes the walls of the tank, hence the "clunk" appellation.

Known prior art fuel tanks of this sort invariably have the opening through which the feed and vent lines pass in an axially placed location. Thus, the feed line and vent generally emerge from the tank in an axial direction at the centerline location of the tank.

Fuel tanks of the above-described sort have proved particularly useful in radio controlled models. These models have long engine run duration, thus necessitating large fuel capacity (on the order of four to sixteen ounces). Moreover, such models are frequently capable of unusual flight altitudes and high-acceleration maneuvers. The foregoing factors make the features of the "clunk" type tank most desirable.

It has heretofore been difficult to adapt the above-described tanks to "profile" models. Such models have a fuselage in the form of a flat slab of more or less constant thickness, but with a silhouette approximating the familiar aircraft profile. The engine and fuel tank in such models are mounted externally. Attempts have been made to recess the fuel tank in order to obtain reduced frontal area and symmetrical weight loading, but the centerline location of the feed line and vent in conventional clunk tanks has proved a serious hindrance in this regard.

Accordingly, it is an object of this invention to provide a fuel tank readily adapted to use in profile models.

Another shortcoming of known prior art fuel tanks, when used in connection with conventional built-up fuselages, has been the need for a relatively long compartment to permit manipulation of the fuel and vent lines to favorable positions for passage through the firewall.

Thus, it is another object of the present invention to provide a fuel tank for model airplanes which can be housed in a compartment of minimum dimensions, yet permits convenient passage of the fuel feed line and vent through the firewall.

Other objects will appear hereinafter.

The foregoing and other objects are accomplished, in a presently preferred form of the invention, by a fuel tank comprising a body having an end wall including a portion extending for about one-half the width of the body in a more or less conventional manner, and a second, angled portion forming a beveled surface with respect to the first end wall portion and a sidewall of the body. The fuel feed line and vent pass through the angled portion, and thus permit mounting of the tank in a centerline position in the fuselage of a profile model, or in the compartment defined by bulkheads spaced but slightly more than the length of the tank in models having built-up fuselage construction.

For the purpose of illustrating the invention there is shown in the drawings a form which is presently preferred; it being understood that this invention is not limited to the precise arrangements and instrumentalities shown.

FIG. 4 is a top plan view of a conventional fuel tank in position in a built-up fuselage;

FIG. 5 is a cross-sectional view taken along the line 5—5 in FIG. 4;

FIG. 6 is a perspective view showing a fuel tank in accordance with the invention in position in a profile fuselage; and FIG. 7 is a partial top plan view taken along the line 7—7 in FIG. 6.

Figure 3:
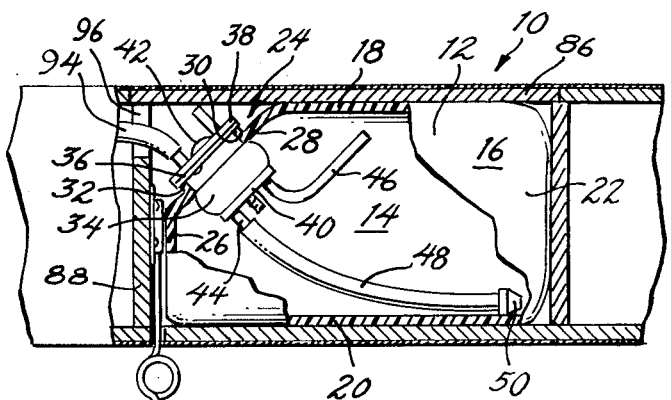
FIG. 3 is a cross-sectional view taken along the line 3—3 in FIG. 2.
Figure 1:
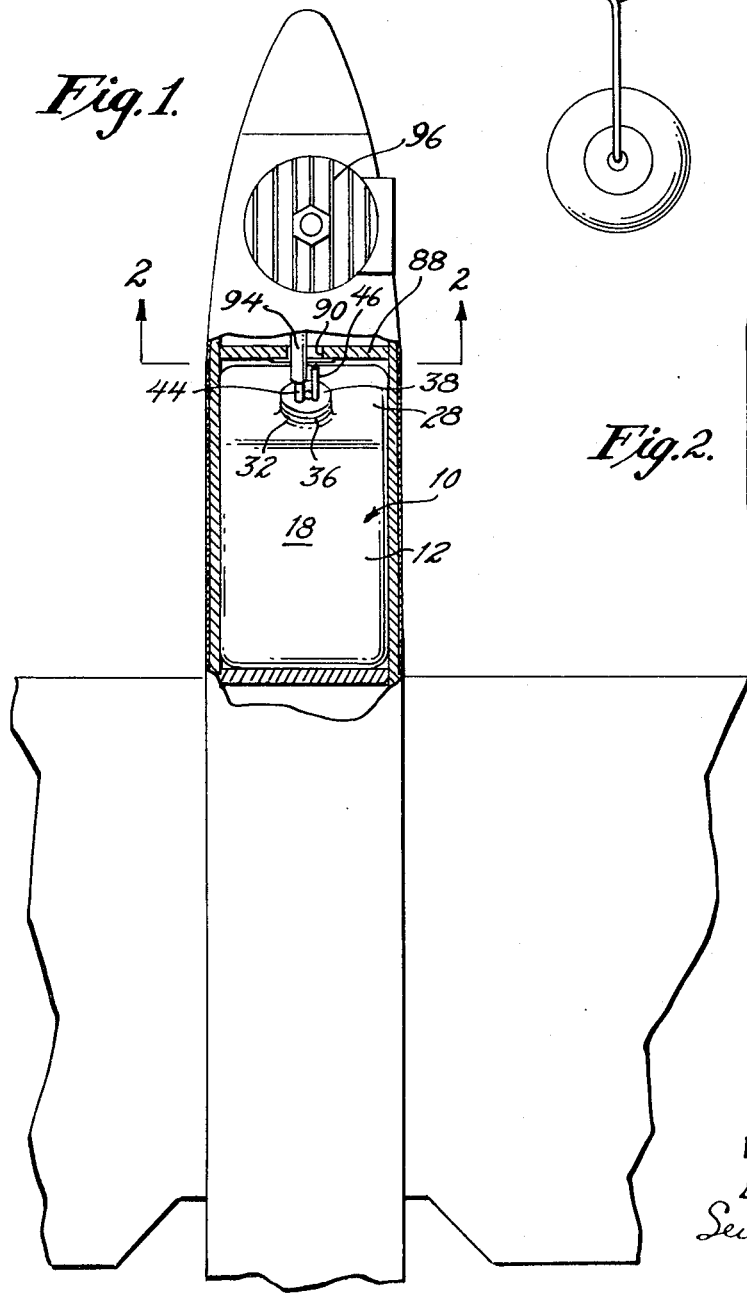
FIG. 1 is a top plan view of a portion of a model airplane, showing the fuel tank in accordance with the present invention in position in a built-up fuselage.

Referring now to the drawings in detail, wherein like numerals indicate like elements, there is seen in FIGS. 1, 3, 6, and 7, a fuel tank in accordance with the present invention, designated generally by the reference numeral 10. The fuel tank 10 includes an enclosed fuel retaining body 12. The body 12, in the illustrated form, is of generally rectangular cross-section, and accordingly, includes juxtaposed pairs of side walls 14, 16, 18 and 20, respectively. Other sectional shapes can, of course, be used, if desired. The body 12 also includes a pair of spaced end walls interconnecting the side walls 14–20. Referring to FIG. 3, there is seen a first end wall 22 and a second end wall, designated generally by the reference numeral 24.

The body 12 may be blow-molded of polyethylene or other suitable fuel resistant material.

The second end wall 24 includes a first portion 26 extending in a direction generally parallel to the direction of the first end wall 22, transversely with respect to a longitudinal axis of the body 12 and also generally at right angles to the side walls 14–20. The second end wall 24 also includes an angled portion 28, which intersects the second end wall 24 and the side wall 18 at obtuse angles. The angled portion 28 intersects the first portion 26 and side wall 18 at angles between about 115° to 155°. FIG. 3 shows a preferred embodiment, wherein the angled portion 28 intersects the first portion 26 and side wall 18 at angles of 135°.

An opening 30 passes through the angled portion 28, and is surrounded by a lip 32. An elastomeric grommet 34, which includes a flange 36, passes through the opening 30. The flange 36 rests on the lip 32.

Washers 38, 40 are clamped in abutment with opposite faces of the grommet 34 by a screw 42 or the like. The screw 42 and washers 38, 40 cause distortion of the grommet 34 into fluid-tight sealing engagement with the opening 30 and the lip 32.

Short lengths of rigid tubing 44, 46 pass through the grommet 34 and washers 38, 40 and are held in fluid-tight sealing engagement with the grommet 34 when the grommet is deformed. The tubing 46 provides a vent between the atmosphere and the interior of the body 12. The tubing 46 forms a part of a fuel feed line, including a length of flexible tubing 48 and an inlet nozzle and "clunk" weight 50.

Referring to FIGS. 6 and 7, the present fuel tank 10 is seen installed in a model 52 which includes a profile fuselage 54. The tank 10 is received in an opening 56 in the fuselage 54, and as is best seen in FIG. 7, protrudes from the fuselage 54 approximately equal amounts on each side. U-shaped brackets 58, 60 serve to retain the tank 10 in the desired position.

It is apparent from FIG. 7 that the angled portion 28 of the second end wall 24 carries the tubing 46 forming the vent and a fuel line associated with the tubing 44 well clear of the fuselage 54. Referring again to FIG. 6, a fuel line 62 may pass through the fuselage 54 to an engine 64 mounted thereon in a conventional manner.

FIGS. 4 and 5 show an installation of the prior art fuel tank 10' in a built-up fuselage. The fuel tank 10' includes an axially directed centerline opening through which a fuel line 64 and vent line 66 pass. The fuel line 64 and vent line 66 include rigid tubing 68 and 70, similar to the tubing 44 and 46 in the previously described fuel tank 10. The fuel tank 10' is housed in a fuselage compartment 72 defined by spaced fuselage sides 74, 76, and a bulkhead 78 and the firewall 80.

Due to the centerline location of the opening in the tank 10' through which the fuel line 64 and vent line 66 pass, it is necessary for the fuel line 64 and vent line 66 to pass as well through openings in the firewall 80. It is possible to cut openings in the firewall 80 precisely in alignment with the tubing 68, 70, and to position the tank 10' close to the firewall 80. This has proved, however, extremely difficult to accomplish in practice. Moreover, with the tank 10' thus mounted, access to the opening of the tank 10' and the tubing 68, 70 is precluded in the assembled model. Consequently, as a practical matter, prior art tanks 10' have been mounted in a manner shown in FIGS. 4 and 5, with substantial clearance between the firewall 80 and front wall of the tank 10'. Such clearance provides necessary room for manipulation of the flexible tubing comprising the fuel and vent lines 64, 66, and permits their passage through spaced openings 82, 84, at non-critical positions on the firewall 80. In conventional built-up fuselages, therefore, using the conventional fuel tank, it is necessary to provide a fuel tank compartment 72 substantially longer than the tank 10'.

By comparison, referring again to FIGS. 1 and 3, a tank 10 in accordance with the present invention can be mounted in a compartment just barely larger than its own external dimensions. The angled portion 28 provides ready access to the tubing 44, 46 and screw 42 should replacement of the grommet 34 or any of the parts within the body 12 prove necessary. Moreover, the grommet 34 and associated tubing 44, 46 are located just below the upper surface of the fuselage, and therefore completely accessible if the surface is provided with a simple hatch cover 86.

As in the previously described construction, it is necessary that the fuel line to the engine pass through the firewall. As is apparent in FIGS. 2 and 3, however, it is only necessary that the firewall 88 in this construction be notched, as at 90, adjacent its upper edge. No critically located openings are necessary. As is apparent in FIGS. 1 and 3, the fuel line 94 to the is readily passed through the notch 90.

Figure 2:
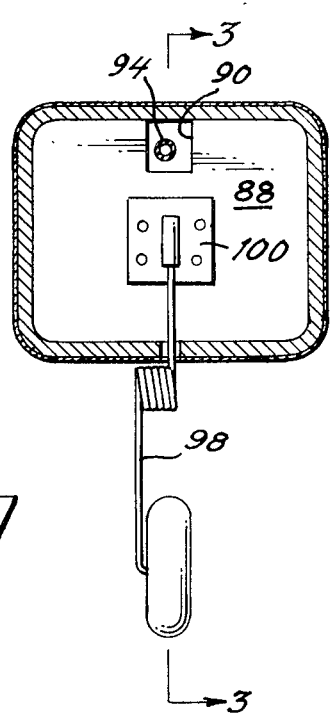
FIG. 2 is a cross-sectional view taken along the line 2—2 in FIG. 1.

An added advantage of the tank 10 over prior art constructions is seen in FIGS. 2 and 3. It has already been seen that use of the prior art tank, with a centerline opening, necessitates passage of the fuel and vent lines through openings generally centrally located in the firewall. Since the fuel line 94 used in conjunction with the tank 10 passes through the notch 90 adjacent the upper portion of the firewall, it now becomes practical to mount hose landing gear, such as the illustrated landing gear 98, by means of a simple mounting plate 100 secured to any desired point on the face of the firewall. The presence of the mounting plate 100 in no way complicates placement of the fuel line 94, as it invariably does when conventional tanks, such as the tank 10', are used.

The present invention may be embodied in other specific forms without departing from the spirit or essential attributes thereof.

I claim:

1. A fuel tank for use in model airplanes, comprising a hollow body having a pair of juxtaposed end walls, and pairs of juxtaposed generally planar side walls, one of said end walls including a first wall portion extending transversely with respect to a longitudinal axis of the body and generally at right angles to said side walls, and a second, angled wall portion extending obliquely between and intersecting said first wall portion and a lateral wall of said body at obtuse angles, an opening in said angled wall portion to provide access to the interior of said body, an elastomeric grommet disposed in said opening, and vent and fuel feed tubes disposed is said opening and extending therethrough in a direction perpendicular to the plane of said angled wall portion to facilitate fuel flow from the interior of said body, said grommet supporting said vent and fuel feed tubes, and means for compressing said grommet to cause said grommet to sealingly engage said opening and said tubes.

2. A fuel tank in accordance with claim 1 wherein said obtuse angles are between about 115° and 155°.

3. A fuel tank in accordance with claim 1 wherein said obtuse angles are about 135°.

4. A fuel tank in accordance with claim 1, and a flexible tube coupled to said fuel feed tube and disposed within said body, a weight at the distal end of said flexible tube, the other of said pair of end walls being of outwardly curved configuration to accommodate swinging of said flexible tube within said body.

5. A fuel tank in accordance with claim 4, wherein said obtuse angle is between about 115° and 155°.

6. A fuel tank in accordance with claim 4, wherein said obtuse angle is about 135°.

* * * * *